(12) United States Patent
Boutboul et al.

(10) Patent No.: US 9,273,954 B2
(45) Date of Patent: Mar. 1, 2016

(54) METHOD AND SYSTEM FOR ANALYZING GEOMETRIC PARAMETERS OF AN OBJECT

(75) Inventors: Laurent Boutboul, Paris (FR); Stéphane Noeuveglise, Versailles (FR)

(73) Assignee: Accenture Global Services Limited, Dublin (IE)

( * ) Notice: Subject to any disclaimer, the term of this patent is extended or adjusted under 35 U.S.C. 154(b) by 539 days.

(21) Appl. No.: 13/642,603

(22) PCT Filed: Apr. 21, 2011
(Under 37 CFR 1.47)

(86) PCT No.: PCT/EP2011/056465
§ 371 (c)(1),
(2), (4) Date: Mar. 28, 2013

(87) PCT Pub. No.: WO2011/131770
PCT Pub. Date: Oct. 27, 2011

(65) Prior Publication Data
US 2014/0078292 A1  Mar. 20, 2014

(30) Foreign Application Priority Data
Apr. 21, 2010 (FR) .................................... 10 53046

(51) Int. Cl.
*H04N 7/18* (2006.01)
*G01B 11/24* (2006.01)
*G06T 7/00* (2006.01)

(52) U.S. Cl.
CPC .......... *G01B 11/2433* (2013.01); *G06T 7/0067* (2013.01)

(58) Field of Classification Search
CPC ........ B42D 25/00; G06T 15/04; G06T 17/20; G06T 7/0046; G06T 7/0067; G06T 15/205; G06T 7/2086

USPC .................. 250/208.1, 559.44; 382/154, 107; 345/15, 24, 419, 440, 440.1, 441, 584
See application file for complete search history.

(56) References Cited

U.S. PATENT DOCUMENTS 6,792,140 B2 * 9/2004 Matusik ................ G06T 7/0065
                                                345/419
8,408,722 B2 * 4/2013 Van Campen ......... G03B 15/06
                                                362/16

(Continued)

FOREIGN PATENT DOCUMENTS

EP    1424656 A2    6/2004
EP    1640915 A2 *  3/2006

(Continued)

OTHER PUBLICATIONS

Lazebnik, S., Y. Furukawa, J. Ponce, "Projective Visual Hulls", International Journal of Computer Vision 74(2), 137-165, DOI:10.1007/s11263-006-0008-x, 2007.*

(Continued)

*Primary Examiner* — Jamie Atala
*Assistant Examiner* — Richard A Hansell, Jr.
(74) *Attorney, Agent, or Firm* — Mannava & Kang, P.C.

(57) ABSTRACT

The present invention concerns a method of geometrical analysis of an object comprising: placing the object in front of a lit surface, such that it is silhouetted; taking at least one photograph of the silhouetted object to obtain an image with an outline of the object; and obtaining geometrical parameters of the object based on the outline of the silhouetted object.

14 Claims, 5 Drawing Sheets

(56) References Cited

U.S. PATENT DOCUMENTS

| | | | |
|---|---|---|---|
| 2002/0145103 A1 | 10/2002 | Bernardini | |
| 2003/0035061 A1* | 2/2003 | Iwaki | G06T 7/0067 348/371 |
| 2008/0137088 A1* | 6/2008 | Wagner | G01B 11/24 356/446 |
| 2009/0154794 A1* | 6/2009 | Kim | G06T 17/20 382/154 |

FOREIGN PATENT DOCUMENTS

| | | | |
|---|---|---|---|
| FR | 2951563 A1 | 4/2011 | |
| GB | EP 1640915 A2 * | 3/2006 | G06K 9/00201 |

OTHER PUBLICATIONS

Lazebnik, S., Y. Furukawa, J. Ponce, "Projective Visual Hulls", International Journal of Computer Vision 74(2), 137-165, DOI:10.1007/si 1263-006-0008-x, 2007.*

Jagnow, R., J. Dorsey, and H. Rushmeier, "Evaluation of Methods for Approximating Shapes Used to Synthesize 3D Solid Textures", ACM Transactions on Applied Perception, vol. 4, No. 4, Article 24, DOI 10.1145/1278760.1278765, 2008.*

Matusik W., et al., "ILmage-based 3D Photography using Opacity Hulls", ACM Transactions on Graphics, ACM, US LNKD-D0I:10. 1145/566570.566599, vol. 21, No. 3, Jul. 1, 2002, pp. 427-437.

International Search Report issued in PCT/EP2011/056465 on Jun. 9, 2011.

* cited by examiner

METHOD AND SYSTEM FOR ANALYZING GEOMETRIC PARAMETERS OF AN OBJECT

FIELD OF THE DISCLOSURE

The present disclosure relates to a method for analyzing geometric parameters of an object and to a system for implementing such a method.

DISCUSSION OF PRIOR ART

There exist different methods for detecting the shape of an object by optical detection of characteristic points of the object and reconstruction thereof as a combination of known elementary shapes.

But the many known shape recognition methods often use geometric shapes that can be described by a mathematical formula; thereby, such methods require, for their acquisition and for their use, optical means and calculation means, which are both complicated and expensive.

However, often it would be desirable to be able to simply recognize the shape of an object for relatively global evaluations such as evaluating the volume of the object.

SUMMARY OF THE PRESENT DISCLOSURE

The present disclosure aims at developing a method and a system that enables the simple and rapid detection of the shape of an object or, at least, an approximate shape of the object, with a sufficient accuracy for a general evaluation of its volume or of its bulk.

For this purpose, according to one aspect of the present disclosure, there is provided a method of geometrical analysis of an object comprising: placing the object in front of a lit surface, such that it is silhouetted; taking at least one photograph of the silhouetted object to obtain an image with an outline of the object; obtaining geometrical parameters of the object based on the outline of the silhouetted object.

Thus, rather than the common practice of detecting characteristic points of the object by optical ranging of these points and the determination of the coordinates of these points in a reference frame, such a method requiring in practice that the characteristic points are determined particularly carefully, the present disclosure requires no more than the outline of the object, which enables characteristic points or the characteristic contour of the projection of the object to be obtained in a much simpler fashion, for then reconstructing two-dimensional or three-dimensional data of the object or data relating to that of the object.

According to one embodiment, the method further comprises;

taking at least two photographs of the object by rotating it around a defined point in front of the lit surface, defining an envelope surface for the object as the intersection of the object image capture cones according to different pivoting angles of the object, the envelope surface being the intersection of the conical surfaces each generated by a generatrix originating from each point from which the object is photographed after a relative rotation of the image capture point, the object being considered as motionless, the generatrix bearing on the directrix curve formed by the outline of the object on the image corresponding to this image capture point, determining the geometric parameters of the intersection surface or of the volume that it surrounds.

Thus, by combining at least two image captures of the object, an envelope of the object can be defined as a three-dimensional surface formed by the intersection of two cones each generated from the image capture points and bearing on the directrix curve formed by the outline of each of the image captures.

This envelope contains the object.

By multiplying the number of image captures, for example increasing the number to three or more, and similarly the number of cone intersections, the envelope surface is made closer and closer to the real surface of the object according to the desired accuracy.

In most cases, two or three image captures are sufficient to obtain an envelope surface accurate enough for the method of assessing features of the object such as its volume or its bulk.

According to another embodiment, at least two image captures of the object are performed, by rotating the object by a determined angle around an axis or a point with respect to the image capture device.

According to another embodiment, the method further comprises:

capturing at least two images of the object by rotating it around a defined point in front of the lit surface, defining an envelope surface for the object as the intersection of the object image capture cones according to different pivoting angles of the object, the envelope surface being the intersection of the conical surfaces each generated by a generatrix originating from each point from which the object is photographed after a relative rotation of the image capture point, the object being considered as motionless, the generatrix bearing on the directrix curve formed by the outline of the object on the image corresponding to this image capture point, determining the geometric parameters of the intersection surface or of the volume that it surrounds.

To define the geometric envelope of the object, it is sufficient to intersect the different cones having their apexes placed in the positions rotated by the relative pivoting angle of the object. This solution has the advantage of using the same image capture device and the same lit surface to capture the different images.

The present disclosure also relates to a system for analyzing geometric parameters of an object implementing the method defined here above. This system comprises a support receiving the object; at least one set formed of an image capture device placed in front of the object and of a lit surface placed behind the object in line with the image capture device and the object such that the object as captured by the image capture device is silhouetted; and a system for using the outline of the image provided by the image capture device.

According to another embodiment, the system for analyzing the geometric parameters of an object implementing the method defined here above comprises a support receiving the object, at least one set formed of an image capture device provided with a combined light source, associated with the position of the image capture device, this set being placed in front of the object and a retroreflective surface placed behind the object in line with the image capture device and its combined light source to light the object from behind, by reflection, with respect to the image capture device as well as a system for exploiting the outline of the image provided by the image capture device.

This system enables the contour of the object to be defined in difficult lighting conditions, for example, for a light or white objects, since all the light beam falling on the retroreflective surface associated with this image capture device will be reflected to the image capture device. This enables to obtain a particularly accurate outline contour. The cutting out performed on the image of the outline will be all the clearer as the light source equipping the image capture device will be close to the image capture device and in particular if the light source is, according to another advantageous feature of the present disclosure, a light corona surrounding the lens of the image capture device.

The precision of the outline contour thus obtained is all the more surprising as the object is itself lit from the front.

The precision of the contour results from the reflection of the entire light beam falling on the retroreflective surface, which has a much greater reflective power than the object, even if said object is shiny, since not all the surface points of the object form elementary mirrors reflecting the entire light beam back towards the light source while all points of the retroreflective surface form elementary mirrors reflecting the light beam back to the source which, according to the present disclosure, is practically incorporated with the image capture device.

According to another embodiment, the system is formed of three sets, each formed of an image capture device or of an image capture device with a combined light source as well as with a lit surface or a retroreflective surface, positioned on either side of the object, these sets being arranged along three spatially orthogonal directions, or at least along three non-coplanar directions.

According to another embodiment, the support of the object pivots in a defined manner with respect to a point or with respect to an axis.

According to another advantageous feature, the support on which the object is placed is transparent so as not to alter the contour of the captured image or to enable the lighting of the object from below without this lighting being disrupted by the support.

According to another advantageous feature, the support is formed of a surface for receiving the object and bordered by two upward-directed surfaces inclined with respect to the vertical direction and joining the support surface via a curved area.

An image capture support having a generally horizontal square or rectangular surface and with two edges disappearing in a transient curved area to extend in the inclined upward-directed surfaces is thus formed.

According to an advantageous feature, the retroreflective surfaces are surfaces substantially parallel to the support surface and to the upward-directed surfaces and are located at a given distance under and behind them, the retroreflective surfaces being substantially perpendicular to the image capture direction of the associated image capture device to optimize the retroreflective effect.

Thus, the transparent support surface, generally made of polycarbonate, does not disturb the image capture to define its contour, the edge between the support surface and the upward-directed surfaces being erased by the curved area shape connecting each of these two surfaces.

According to another embodiment, the support, which is a fixed element of the system, is taken into account in the calculation program defining the outline of the object.

BRIEF DESCRIPTION OF THE DRAWINGS

The present disclosure will be described in further detail hereafter by means of the accompanying drawings, among which.

DESCRIPTION OF EMBODIMENTS OF THE PRESENT DISCLOSURE

Figure 1:
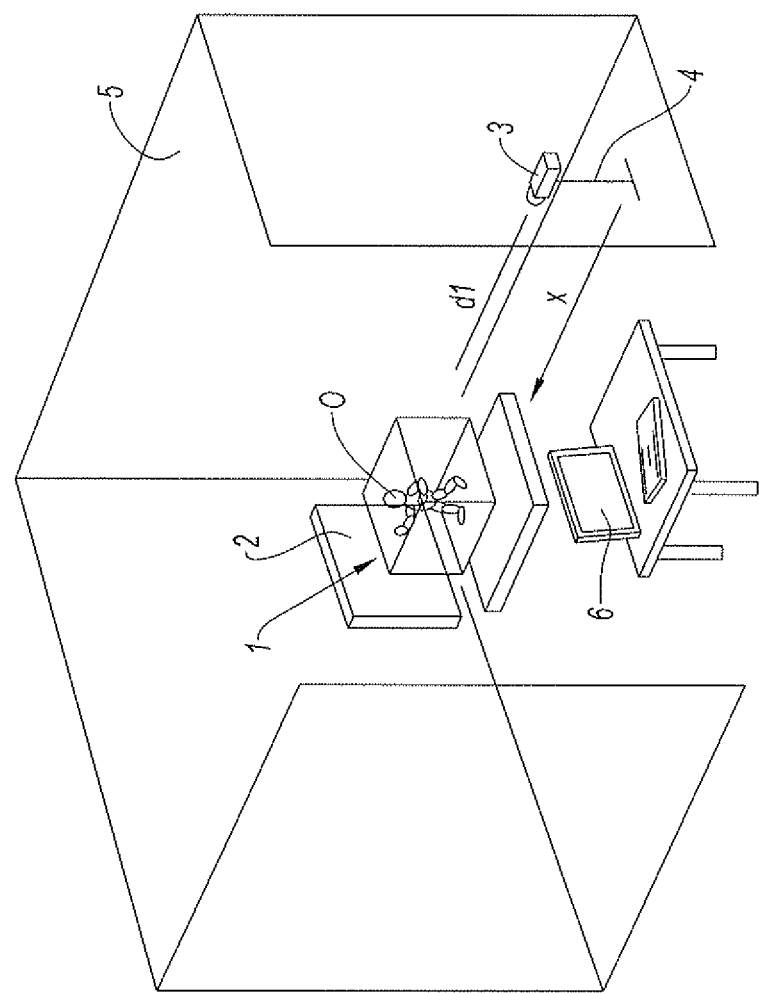
FIG. 1 is a schematic diagram of a method according to an embodiment of the present disclosure and of an elementary system for implementing it.

According to FIG. 1, an embodiment of the present disclosure relates to a method and a system for analyzing and defining features or geometric parameters of an object O. This object, represented by a figurine, is placed on a support 1 in front of a lit surface 2, for example, a backlit panel, to light from behind the object for which an analysis and/or a definition of its shape or, more generally, certain parameters, are desired to be obtained without having to perform an accurate point-by-point detection of the object.

Support 1 is represented by a cube surrounding object O. For example, the support 1 has the form of an articulated bracket or articulated jib crane on which object O is placed and/or fixed.

In front of object O, silhouetted with respect thereto, the system comprises an image capture device 3 such as a video camera or a photographic camera, placed in a precise position with respect to the position of the object, on a support 4, which is at a fixed or adjustable height and distance with respect to the position of the object, that is, with respect to its support 1. Lit surface 2 is, preferably, a surface with evenly distributed lighting.

The system is protected against any parasitic exterior lighting by panels 5 or screens, which may also be the partitions of the premises in which the system is located.

Figure 2:
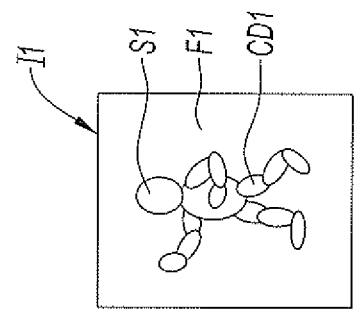
FIG. 2 is a simplified view of a captured image of the object silhouetted in front of the lit surface.

According to a method of the present disclosure, object O is silhouetted by lit surface 2 without lighting the object from the front, from the side of image capture device 3, and a view of the silhouetted object is captured. Thus, the obtained image I1 of FIG. 2 shows outline S1 of the object, which stands out on a light background F1. A simple analysis of image I1 provides the coordinates of the points of the contour (CD1) of outline S1.

The object may also be lit from the front but the contrast with the back lighting is for example sufficient to enable the contour of the object to be defined as an outline.

The image thus taken of outline S1 of view I1 and the definition of the position of image capture device 3 with respect to object O enable certain geometric features of the object to be determined, such as two-dimensional features in the case of a single image capture or, more generally, three-dimensional features for several image captures, as will be detailed hereafter.

FIG. 1 schematically shows a computer 6 receiving the captured images and controlling, if need be, the image capture operations and the determination of the geometric features of the object.

Figure 3A:
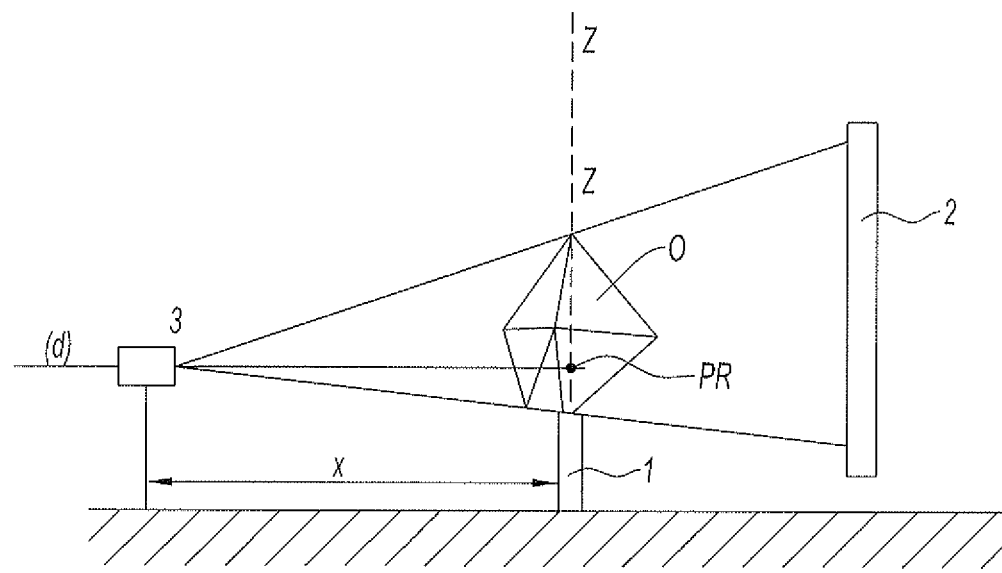
FIG. 3A is a diagram of the system.
Figure 3B:
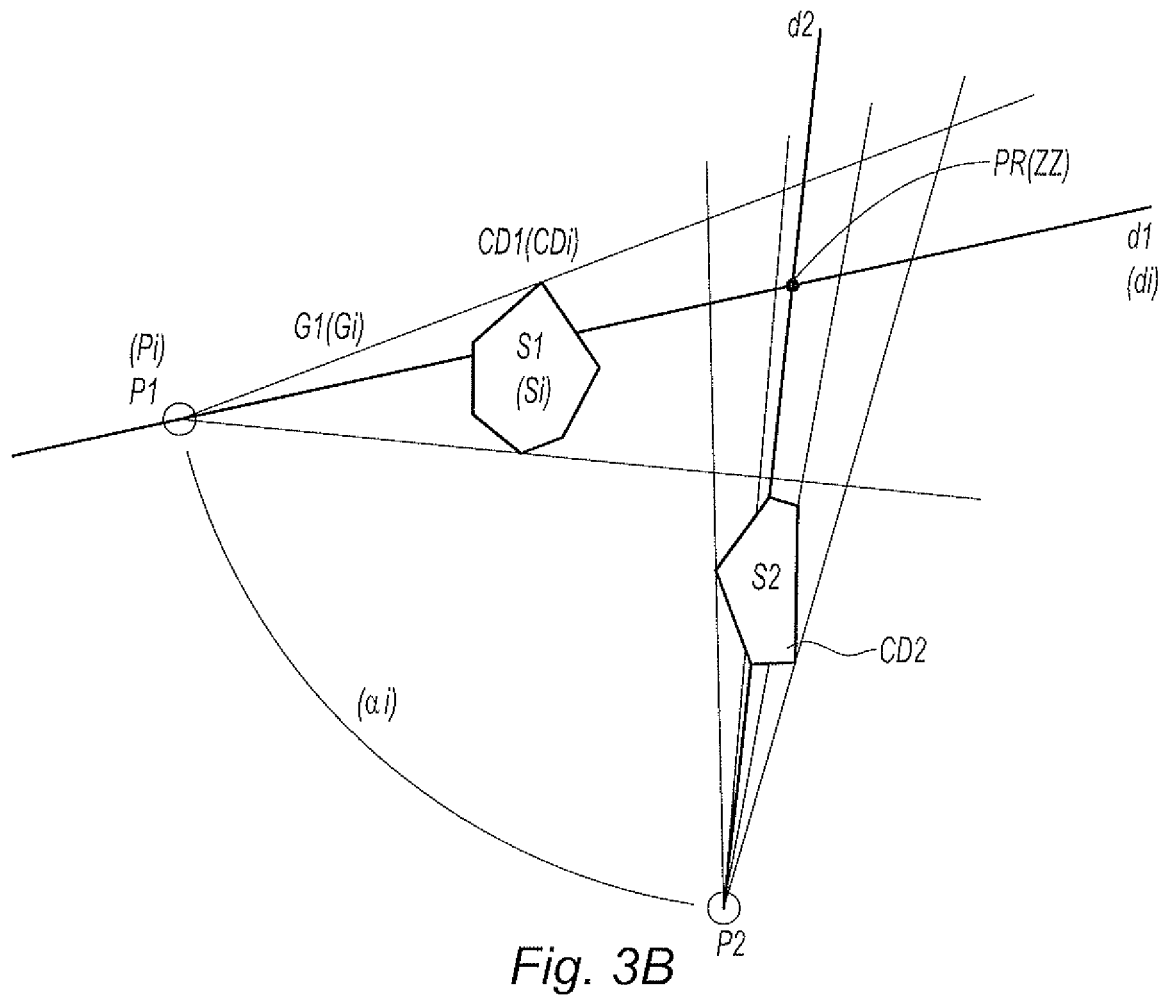
FIG. 3B is a diagram representing a definition of the envelope surface of the object based on two image captures.

FIGS. 3A and 3B schematically show the conditions of an image capture and what use is made of the shape of the object according to a method of the present disclosure.

FIG. 3A is a side view of an elementary system providing an example of the implementation of a method of the present disclosure. A screen-shaped lit surface 2 faces an image capture device 3 with a support 1 between them to receive object O to be analyzed. Support 1 according to this embodiment pivots around a vertical axis ZZ. Image capture device 3 is located at distance (x) from axis ZZ in the horizontal plane and it has a horizontal image capture direction (d), crossing axis ZZ at a reference point PR. The distance separating lit surface 2 and support 1 is not accurately determined since the only thing that matters is the coverage of object O by lit surface 2, as seen and captured by image capture device 3, so that the contour of object O is contained within lit surface 2. Object O is installed on its support 1 in any manner, although preferably it is installed by selecting a position substantially regularly distributed around reference PR. Reference point PR does not necessarily correspond, a priori, to the center of object O.

According to one embodiment, reference point PR of support 1 is a joint enabling to pivot around an axis perpendicular to axis ZZ, that is, in the conditions of FIG. 1, around a horizontal axis.

Support 1 comprises location means, not illustrated, enabling the pivoting angle ($\alpha i$) around axis ZZ to be determined and, in some cases, the pivoting angle around an axis perpendicular to axis ZZ, passing through reference point PR, to be determined.

This system enables different image captures of object O to be performed, without modifying or displacing the set formed of lit surface 2 and of image capture device 3; these different relative orientations between the object and the image capture device will allow different views of the object to be obtained for analysis. These views are made with associated rotation or pivoting angles ($\alpha i$) of the object, the other image capture conditions remaining the same for all image captures, and thus being known.

Thus, starting from an image Ii of object O in a given orientation $\alpha i$, the relative orientation of object O with respect to the equipment formed by lit surface 2 and image capture device 3 is modified, to capture another image of the object according to a different angle.

The two obtained images I1, I2 each provide an outline S1, S2 of the object along the corresponding image capture direction (d1, d2). This outline provides a contour CD1, CD2 in the plane of image I1, I2.

Two or more images Si enable an envelope surface for the object to be defined, as will be explained by means of the diagram of FIG. 3B, which is a geometric drawing in a plane perpendicular to axis ZZ, since it has been assumed that direction (d) of the image captures is in a horizontal plane.

The captured images are digital images processed by a computer 6, which records them at the same time as it records the image capture parameters, essentially the image capture direction angles (relative object/image capture direction/distance orientation). Based on this data, computer may combine geometric shapes, as will be explained hereafter.

In order to obtain a surface enveloping object O and enabling at least approximate geometric parameters to be deduced therefrom, the images are combined. This combination is performed by a calculation program comprising the determination of the geometric intersection of two or several conical surfaces or cones C1, C2 obtained from the images. The geometric features of an image capture bear as a suffix the numerical reference associated with each image capture and, generally, "i".

Thus, for each image capture, the relative position of image capture device 3 bears reference Pi, the contour of the outline of the captured image bears the reference CDi and the image capture direction bears the reference di.

The different image captures are shifted from one another or with respect to the first image capture, by an angle $\alpha i$, which is the pivoting angle of object O with respect to a reference position of its support 1 or the angle $\alpha 1$ of an image capture device. In the case of an image capture device 3 and of a lit surface 2, which are both mobile, the different image captures will be performed according to a pivoting angle $\alpha i$ of the set around axis ZZ with respect to a fixed object O.

To form, according to the present disclosure, the envelope surface of the object, the intersection of conical surfaces C1 associated with each image capture Ii is determined.

FIG. 3B illustrates how an envelope surface, not shown in the drawing, is obtained based on two image captures that resulted in images I1, I2 with outline contours CD1, CD2 along image capture directions d1, d2 and positions P1, P2 of the image capture device.

According to a method of the present disclosure, the surface formed by the intersection of cones or conical surfaces is formed. Each conical surface is generated by a generatrix Gi passing through image capture point Pi and bearing on contour CDi of outline Si of image Ii of object O from this point Pi. The two cones C1, C2 of this example are placed with respect to each other to reconstruct the image capture conditions, that is, the geometric parameters of the image capture:

apexes P1, P2 of the cones are placed at a distance X1 from a point representing reference mark PR of the object;

image capture directions d1, d2 pass through reference point PR;

the two image capture directions d1, d2 of the two image captures I1, I2 form together an angle $\alpha i$ equal to the pivoting angle $\alpha i$ of object O around its axis ZZ between the two image capture directions;

the surface intersecting these two cones C1, C2 envelopes the object.

According to the shape of the object, image capture angles $\alpha i$ are selected that enable an envelope as close as possible to the shape of object O to be defined in the best manner. By increasing the number of image captures, the cone intersection surface is brought closer to the surface of the object.

The intersection of cones C1, C2, Ci is obtained by a mathematical method from the digital data of each generatrix curve CDi and from the position of its image capture point Pi.

The envelope surface of the object enables the geometric features or parameters of the object to be determined, such as its largest dimension, its smallest dimension, the approximate limit of its volume, etc.

In the case of a volume having recesses completely crossing the volume, according to the geometric parameters which are desired to be determined, these empty volumes may be eliminated since they belong, in principle, to the contour of the object, which will be defined by a complex cone or a set of several cones having the same apex.

The geometric image capture conditions given here above in the case of FIG. 3A are not imperative. Thus, the image capture direction di is not necessarily the horizontal direction and the distance x between the image capture device and reference point PR or reference axis ZZ of support 1 or of object O installed on support 1 are not necessarily the same for all image captures. Each time, it is sufficient for the distance x to be known to enable the construction of the intersection of the conical surfaces as generally described in the case of FIG. 3B.

Figure 4:
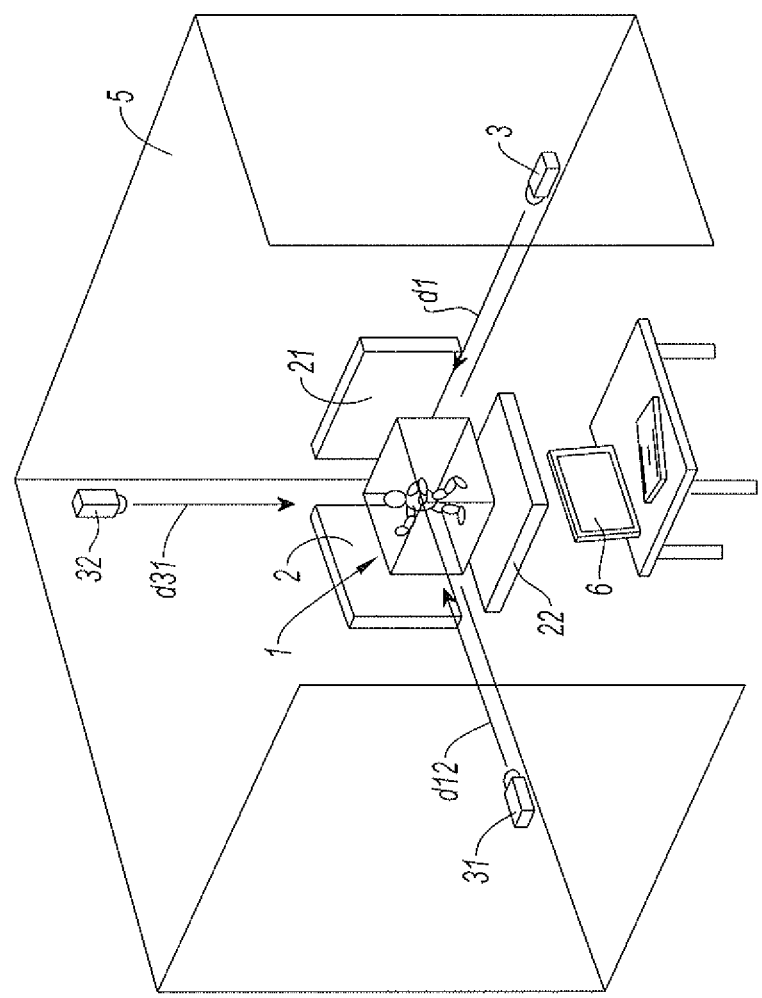
FIG. 4 shows a system according to the present disclosure, with three sets for image captures along three perpendicular directions.

FIG. 4 shows another example of a system for the implementation of the method of geometric analysis of an object. This drawing is similar to FIG. 1, but completed by two other image capture devices 31, 32 and their associated lit surfaces 21, 22. The sets of image capture devices 31, 32/lit surface 21, 22 for lighting object O from behind are generally located along three spatially orthogonal directions: two directions (d1, d2) in a horizontal plane and a direction (d13). For vertical direction (d13) ZZ, support 1 of object O is located above horizontal lit surface 22, thus lighting object O from below.

In the case of this system, the image capture directions (d1, d12, d13) of the three image capture devices pass, preferably, through reference point PR, which thus forms the center of an orthonormal reference frame.

In the case of several image capture devices as in this example, the image captures are for example performed sequentially and not simultaneously, so that object O is only lit from the back, each time, by the lit surface associated with one of the image capture devices. However, if the image capture directions are orthogonal, it is possible to perform simultaneous image captures, since the lighting in the different directions has no reciprocal influence or only a negligible one, and thus does not disrupt the outlines providing the contour of the object.

The use of the outlines of the images taken in the three orthogonal directions by means of the system of FIG. 3 enables an envelope surface for the object to be determined.

Figure 5:
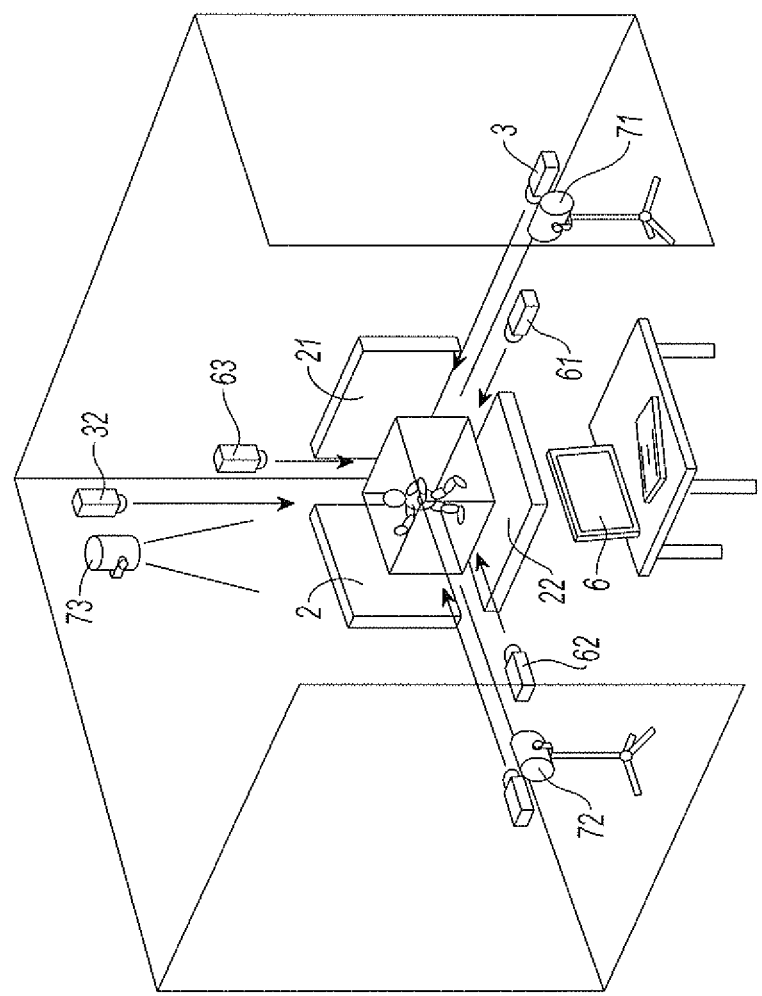
FIG. 5 is a more complete diagram of a system implementing the method of the present disclosure.

FIG. 5 shows a system similar to the previous ones, but more complete. This drawing shows, in addition to the image capture device/lit surface sets in three spatially orthogonal directions, another image capture device 61, 62, 63 in each case, with different optics (small or large field optics, fixed or variable focal length).

The system is also completed by three projectors 71, 72, 73 lighting object O in the three perpendicular directions.

Second image capture devices 61, 62, 63 may be used to capture images of the object, each time against a light background formed by lit surface 2, 21, 22.

Lighting devices 71, 72, 73 are off during these image captures of the outlines against the lit background.

The system however also enables a photograph of object O to be captured in the three image capture directions and, for this purpose, the object is lit by one or the three projectors 71, 72, 73, and the image capture is performed by means of one or the other of the two image capture devices.

These images of the object, which are not outline images, may be used for purposes other than the assessment of geometric features of the object from its outline in different directions.

Figure 6:
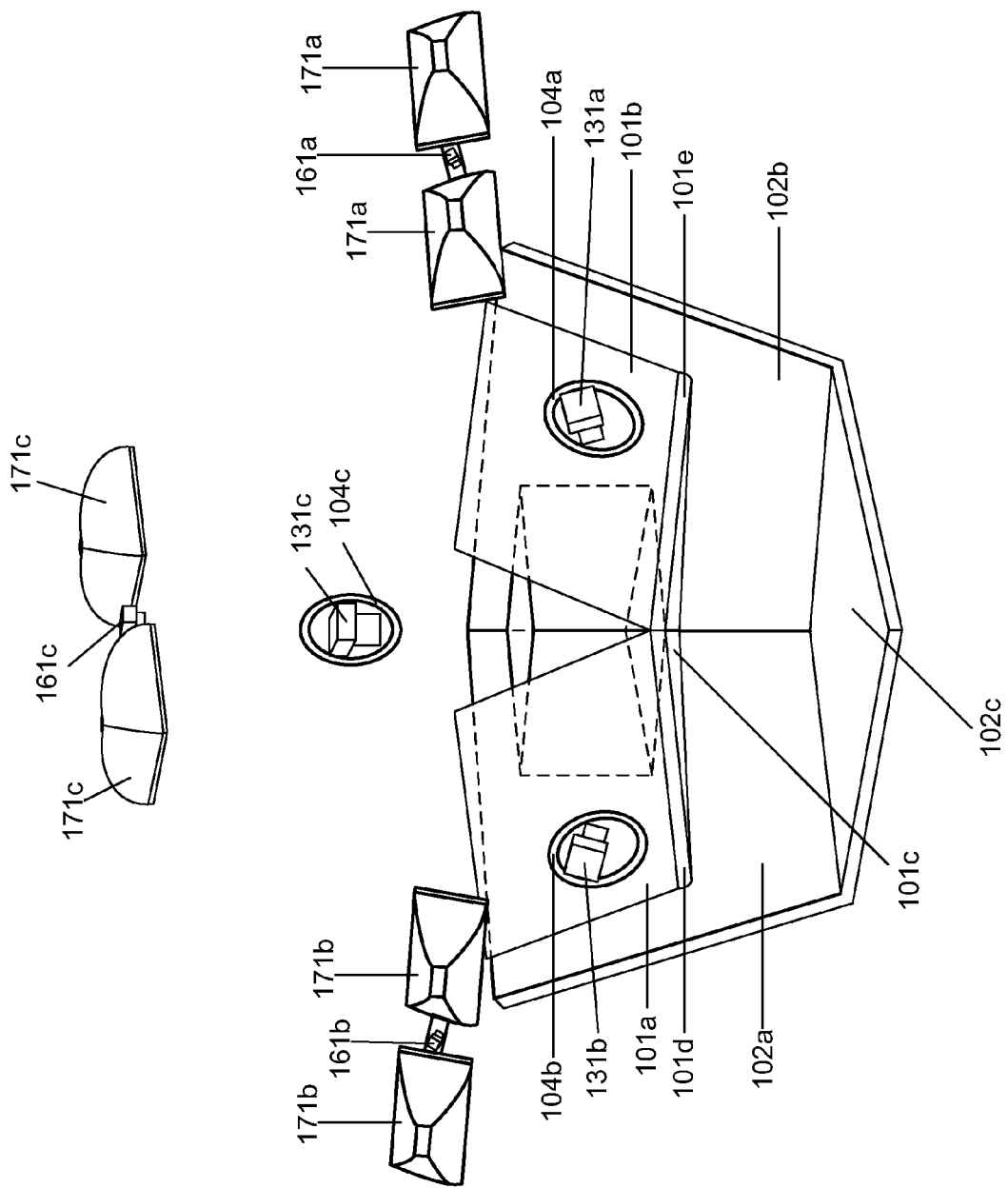
FIG. 6 is a simplified view of an alternative embodiment of the system with three sets for image captures along three spatial directions.

FIG. 6 schematically shows an alternative embodiment of a system for capturing images along three spatial directions and implementing the above-described method.

In this example system, object O represented by a rectangular parallelepiped is placed on a support 101 formed by a generally horizontal support surface 101c, of rectangular or square shape, bordered by two inclined upward-directed surfaces 101a,b joining support surface 101c via curved areas 101d,e. Support 101 is placed in a retroreflective assembly formed by a horizontal lower surface 102c and two lateral surfaces 102a, 102b joining, each time, to form a dihedral. Lateral surfaces 102a,b are preferably inclined with respect to the vertical direction in the reference plane formed by lower surface 102c. Retroreflective surfaces 102a,b,c are formed by panels provided with a catadioptric-effect surface, that is, a surface reflecting the light in the incident direction. This retroreflective surface may be formed by paint, fabric, or auto-adhesive strips.

Respective image capture devices are associated with three non-coplanar spatial directions. Thus, an image capture device 131a equipped with a combined light source 104a directly associated therewith, that is, which emits light practically from the same point as that where image capture device 131a is located, corresponds to one of the directions. Combined light source 104a preferably is a ring-shaped light source surrounding the lens of image capture device 131a. This image capture device is located in front of object O and a retroreflective surface 102a associated with this image capture direction is located on the other side of object O.

Since the image capture direction of image capture device 131a is slightly inclined with respect to the horizontal direction, assumed to be that of the plane or of the surface on which object O is positioned, the associated retroreflective surface 102a is preferably inclined to be perpendicular or substantially perpendicular to this image capture direction. Upward-directed surface 101a located on this image capture axis behind object O is preferably also inclined to be substantially perpendicular to this image capture direction.

One of the other image capture directions is also preferably slightly inclined with respect to the horizontal plane and is formed of elements identical to those described, that is, an image capture device 131b equipped with a combined light source 104b directly associated therewith. This equipment is in front of object O; a retroreflective surface 102b is placed on the other side of the object and an upward-directed surface 101b joining support surface 101c via a curved area 101e is also placed in front of this surface.

For the third image capture direction, which is substantially vertical or inclined with respect to the vertical direction with respect to the plane of support surface 101c, there also is an image capture device 131c, also equipped with its directly associated combined light source 104c. Image capture device 131c takes a top view of object O, towards support surface 101c and the retroreflective surface 102c placed thereunder.

Support surface 101c is held, for example, connected to retroreflective surfaces 102a,b,c, by support rods preferably aligned, each time, with the image capture direction of each of image capture devices 131a,b,c to leave only a weak mark on the captured image at each time.

The above-described image capture system enables the outline of the object to be obtained in the three image capture directions on the retroreflective background. As with the system of FIG. 5, in this embodiment, image capture devices 161a,b,c have also been provided for normal image captures of object O in three directions (and no longer for obtaining a mere outline of the object). In this case, the lighting is for example ensured by pairs of projectors 171a,b,c, each associated with an image capture device 161a,b,c. These pairs of projectors may also be light boxes generally used to take pictures of objects and enabling a distribution of the light emitted towards the object over a significant surface area to evenly light the object and avoid the light being too concentrated on certain reflective surfaces towards the image capture device.

NOMENCLATURE 1 object support
2, 21, 22 lit surface
3, 31, 32 image capture device
4 support of image capture device 3
5 panel
61, 62, 63 image capture device
71, 72, 73 projector
101 object support
101c support surface/lower surface
101a,b upward-directed surface
101d,e curved area
102a,b,c retroreflective surface 104a,b,c combined light source
131a,b,c image capture device
161a,b,c image capture device
171a,b,c projectors, projector pairs
O object
Pi (1, 2, . . . ) position of the image capture device
Si image of object O on the view/outline
Gi generatrix
CDi (1, 2, . . . ) directrix curve
di (1, 2, . . . ) image capture direction
αi angle between two image capture directions
PR reference point
x distance between the image capture device and reference point PR or axis ZZ
ZZ rotation axis of support 1/vertical axis

The invention claimed is:

1. A method of geometrical analysis of an object comprising:
supporting the object on a support surface bordered on two adjacent sides with two upward-directed surfaces, inclined with respect to a vertical direction, wherein the object is positioned on the support surface in front of retroreflective surfaces parallel to the support surface and to the upward-directed surfaces, such that the object is silhouetted, wherein the retroreflective surfaces are positioned under and behind the support surface and its adjacent sides;
taking at least one photograph of the silhouetted object to obtain an image with an outline of the object; and
obtaining geometrical parameters of the object based on the outline of the object and a surface enveloping the object.

2. The method of claim 1, further comprising:
taking at least two photographs of the object in corresponding viewing directions;
defining an envelope surface for the object as the intersection of conical surfaces each generated by a generatrix originating from each point from which the object is photographed and bearing on the directrix curve formed by the outline of the object; and
determining the geometric parameters of the envelope surface or of the volume that it surrounds.

3. The method of claim 1, further comprising:
taking at least two photographs of the object by rotating it around a defined point in front of the lit surface;
defining an envelope surface for the object as the intersection of object image capture cones according to different pivoting angles of the object, the envelope surface being the intersection of the conical surfaces each generated by a generatrix originating from each point from which the object is photographed after a relative rotation of the image capture point, the object being considered as motionless, the generatrix bearing on the directrix curve formed by the outline of the object on the image corresponding to this image capture point; and
determining the geometric parameters of the intersection surface or of the volume that it surrounds.

4. The method of claim 1, wherein at least two image captures of the object are performed, by rotating the object by a determined angle around an axis or a point with respect to the image capture device.

5. A system comprising:
a support surface receiving an object, wherein the support surface is bordered on two adjacent sides with two upward directed surfaces, inclined with respect to the vertical direction;
three sets formed of an image capture device or an image capturing device and a light source, wherein the three sets are positioned in front of the object;
retroreflective surfaces positioned behind the object in line with each of the image capture devices and the object such that the object as captured by the image capture device is silhouetted, wherein the three sets are arranged along three spatially orthogonal or non-coplanar directions and wherein the retroreflective surfaces are parallel to the support surface and to the upward-directed surfaces and are located at a given distance under and behind them, and the retroreflective surfaces are perpendicular to an image capture direction of each image capture device; and
a processing device for using the outline of the image provided by the image capture device to obtain geometrical parameters of the object based on the outline of the object and a surface enveloping the object.

6. The system of claim 5, wherein the support of the object pivots in a defined manner with respect to a point or with respect to an axis.

7. The system of claim 5, wherein the support on which the object is placed is transparent.

8. The system of claim 5, for analyzing geometric parameters of an object by a method according to which:
the object is placed in front of a lit surface such that it is silhouetted,
at least one photograph of the silhouetted object is taken to obtain an image with an outline of the object,
geometrical parameters of the object are obtained based on the outline of the silhouetted object, and
wherein:
the upward-directed surfaces, inclined with respect to the vertical direction and join the support surface, each time, via a curved area.

9. The system of claim 8, wherein the lit surface placed behind the object is a retroreflective surface placed behind the object in line with the image capture device and its combined light source to light the object by reflection silhouetted with respect to the image capture device.

10. The system of claim 8, wherein the support of the object pivots in defined manner with respect to a point or to an axis.

11. The system of claim 8, wherein the support of the object is transparent.

12. The method of claim 1, wherein:
the two adjacent sides with two upward-directed surfaces, inclined with respect to the vertical direction are joining the support surface via a curved area.

13. The method of claim 3, further comprising intersecting the different cones having their apexes placed in the positions rotated by the relative pivoting angle of the object.

14. The system of claim 5, wherein the support is formed of a surface for receiving the object and bordered by two upward-directed surfaces inclined with respect to the vertical direction and joining the support surface via a curved area.

* * * * *